United States Patent
Matos (10) Patent No.: US 7,350,748 B2
(45) Date of Patent: Apr. 1, 2008

(54) MODULAR CONSTRUCTION OF AN AIRCRAFT CONTROL SYSTEM

(75) Inventor: Jeffrey A. Matos, New Rochelle, NY (US)

(73) Assignee: Karl F. Milde, Jr., Mahopac, NY (US), Part Interest ( * ) Notice: Subject to any disclaimer, the term of this patent is extended or adjusted under 35 U.S.C. 154(b) by 183 days.

(21) Appl. No.: 11/385,270

(22) Filed: Mar. 21, 2006

(65) Prior Publication Data

US 2007/0029449 A1 Feb. 8, 2007

Related U.S. Application Data

(60) Provisional application No. 60/663,852, filed on Mar. 21, 2005.

(51) Int. Cl.
*B64C 13/16* (2006.01)

(52) U.S. Cl. .......... 244/76 R; 244/189; 244/99.2; 701/2; 701/16

(58) Field of Classification Search .......... 244/75.1, 244/76 R, 99.2, 99.3, 175, 189, 195; 701/2, 701/3, 16; 340/945

See application file for complete search history.

(56) References Cited

U.S. PATENT DOCUMENTS

| | | | |
|---|---|---|---|
| 6,641,087 B1 * | 11/2003 | Nelson | 244/118.5 |
| 6,691,956 B1 * | 2/2004 | Waterman | 244/189 |
| 6,739,556 B1 * | 5/2004 | Langston | 244/189 |
| 6,995,688 B2 * | 2/2006 | Reynolds | 340/945 |
| 7,006,904 B2 * | 2/2006 | Pippenger | 701/3 |
| 7,110,866 B1 * | 9/2006 | Dutu | 701/11 |
| 7,120,521 B2 * | 10/2006 | Lilley | 701/3 |
| 7,183,946 B2 * | 2/2007 | Boudrieau | 340/945 |
| 2006/0032987 A1 * | 2/2006 | Akers et al. | 244/175 |
| 2006/0167598 A1 * | 7/2006 | Pennarola | 701/11 |
| 2007/0142980 A1 * | 6/2007 | Ausman et al. | 701/3 |

* cited by examiner

*Primary Examiner*—J. W Eldred
(74) *Attorney, Agent, or Firm*—Milde & Hoffberg, LLP (57) ABSTRACT

Apparatus is disclosed for disabling on-board pilot operation of an aircraft and transferring aircraft operation to an alternate source of control. The aircraft has an aircraft control system for controlling at least one controlled component, such as an aircraft attitude control surface or an aircraft engine throttle. The apparatus is of modular construction, and includes two control modules. A first control module has an interruptible link that passes the first control signals from the control device to the aircraft control system. This first control module has a first connecting device for (i) interrupting the link and (ii) directing said first control signals to a second control module. The second control module is adapted to be connected to (e.g. plugged into) the first control module, and has a second connecting device. This connecting device is responsive to third control signals, for connecting one of (i) the first control signals received from the first control module and (ii) second control signals received from an alternate source of control, to the aircraft control system for control of the aforementioned controlled component.

56 Claims, 8 Drawing Sheets

FIG. 6A

MODULAR CONSTRUCTION OF AN AIRCRAFT CONTROL SYSTEM

CROSS-REFERENCE TO RELATED PATENTS AND APPLICATIONS

The subject matter of this application is related to that disclosed in the U.S. Pat. No. 6,917,863, issued Jul. 12, 2005 and entitled "SYSTEM FOR ASSUMING AND MAINTAINING SECURE REMOTE CONTROL OF AN AIRCRAFT", which patent is incorporated herein by reference. The subject matter of this application is also related to that of the U.S. patent application Ser. No. 10/919,169, filed Aug. 16, 2004, and entitled "METHOD AND SYSTEM FOR CONTROLLING A HIJACKED AIRCRAFT". This application was published on Feb. 16, 2006 under the Publication No. US2006/0032978, which publication is also incorporated herein by reference. Further, the subject matter of this application is related to that of the U.S. patent application Ser. No. 11/318,180 filed Mar. 10, 2006, and entitled "METHOD AND SYSTEM FOR CONTROLLING A HIJACKED AIRCRAFT".

This application claims priority from U.S. Provisional Application No. 60/663,852, filed Mar. 21, 2005.

BACKGROUND OF THE INVENTION

The present invention relates to apparatus for assuming and maintaining secure control of an aircraft in the event of an intended, attempted or actual attack upon the pilot(s) of the aircraft, the aircraft in general, or in the event of incapacity of the pilot(s). As is well known, terrorists and hijackers sometimes attempt to assume control of an aircraft by intimidating either the passengers and/or the crew. Once the attacker (terrorist or hijacker) takes control of an aircraft, he or she may cause it to fly to an inappropriate destination or may even cause the aircraft to crash.

The U.S. Pat. No. 6,917,863 discloses a method and system for assuming and maintaining secure remote control of an aircraft in the event of an actual or potential aircraft hijacking or incapacity of the pilot(s) due to illness or injury. The U.S. Patent Publication No. US2006/0032978 discloses a number of scenarios which, in the event of a hijacking or other incapacity of the pilot(s), entail an early autopilot/flight management computer control phase, followed by a later remote pilot control phase, whereby personnel on the ground or in another aircraft can assist in bringing the aircraft down for a safe landing at a desired location. The U.S. patent application Ser. No. 11/318,180 discloses and claims a method and system for disabling on-board pilot control of a non-fly-by-wire aircraft in the event of an emergency condition.

In the event of a hijacking, it is imperative that, once an emergency condition is declared, no one on board the aircraft (including the attackers) be allowed to influence or control the flight path of the aircraft. The aforementioned patent and patent applications disclose various methods of interrupting on-board pilot control of the aircraft, and operating the aircraft either automatically, with the aid of an autopilot and/or flight control system, or by a remote off-board (off-aircraft) human pilot.

Whether the aircraft be entirely electronically controlled or at least partially mechanically controlled, it has what will be termed hereafter an "aircraft control system" for controlling the various controlled components, such as the aircraft attitude control surfaces or the aircraft engine throttle(s). This aircraft control system is controlled either by the on-board pilot of the aircraft or by an alternate source of control such as an autopilot or a flight control system or even a remote off-aircraft pilot. The present invention relates to the apparatus, principally electronic, for disabling on-board pilot operation of the aircraft and transferring aircraft operation to the alternate source of control in the event of a hijacking. Hereinbelow, "hijacking" is intended to refer to any or all of (a) the attempt of one or more unauthorized persons to gain control of an aircraft, (b) an aircraft emergency which prevents proper pilot control and (c) in-flight pilot impairment or incapacity. "Anti-hijacking" refers to the prevention or remedy of a hijacking as defined hereinabove.

Modification of an aircraft, after certification of the type, is extremely time consuming and expensive. Even a seemingly insignificant change in the control system of an aircraft must be modeled, tested and must undergo certification by the Federal Aviation Administration (FAA). It is therefore difficult to retrofit an improvement in an aircraft control system once the aircraft has been constructed and certified as airworthy.

SUMMARY OF THE INVENTION

The principal object of the present invention is to provide a means of aircraft construction which allows for an initial lower cost construction phase, which produces an aircraft that (i) does not contain all of the equipment necessary for aircraft control by a source other than the on-board pilot, but (ii) does contain equipment which allows an upgrade (to alternate source of control capability) to be easily accomplished after initial aircraft construction has been completed. If, at a later time, the upgrade is deemed necessary, it can be accomplished without a potentially expensive retrofitting (which would have entailed the removal of already installed aircraft control equipment and its replacement with equipment having anti-hijacking/emergency control capability).

A further object of the present invention is to provide apparatus for disabling on-board pilot operation of an aircraft and transferring aircraft operation to an alternate source of control, which may be easily retrofitted into an existing aircraft.

These objects, as well as still further objects, which will become apparent from the discussion that follows, are achieved, in accordance with the present invention, by constructing the apparatus as two or more separate, connectable modules, as follows:

A first, or aircraft control module has an interruptible link which passes on-board pilot control signals from a control device to the aircraft control system. This first control module has a first connecting device for (i) interrupting the link and (ii) directing said first control signals to a second control module. A second control module, hereinafter called an "alternate source of control module", is adapted to be connected to (e.g. plugged into) the first control module, and has a second connecting device. This second connecting device is responsive to third control signals, for selectively connecting one of (i) the first control signals received from the first control module and (ii) second control signals received from one of the alternate sources of control, to the aircraft control system for control of the aforementioned controlled component(s).

According to a further aspect of the invention, the first connecting device is responsive to the act of connection of the second, alternate source of control module to the first aircraft control module to interrupt the link between the on-board pilot and the controlled component, to direct said first control signals to the second connecting device and to connect the aircraft control system to the second connecting device. When this happens, third control signals cause the second connecting device to select one of (i) the first control signals and (ii) the second control signals, to pass to the aircraft control system for controlling the controlled component(s).

This modular construction, according to the invention, has a number of advantages:

(a) It allows for the decision about whether to include anti-hijacking capability to be made after initial aircraft construction. At some later time an aircraft constructed with only the aforementioned first control module may be easily upgraded by installing one or more additional modules which allow for a source of aircraft control other than the on-board pilot.
(b) It allows future upgrades of some of the anti-hijacking circuits and components to be accomplished with limited aircraft system replacement.
(c) It facilitates routine servicing of the anti-hijacking equipment.
(d) It facilitates servicing of the anti-hijacking equipment after a hijacking event (which event may result in certain permanent programming of the anti-hijacking equipment to prevent on-board pilot control).
(e) It facilitates a potential cost-saving partial upgrade of already-built aircraft, limiting the initial expenditure of funds to a first phase entailing retrofitting with the aforementioned first control module. Later, and only in the event that the level of terrorist activity warrants it, an additional expenditure of funds for a second phase would occur, in which the aforementioned alternate source of control module (and other modules, as needed) could be quickly and easily installed.

For a full understanding of the present invention, reference should now be made to the following detailed description of the preferred embodiments of the invention as illustrated in the accompanying drawings.

DETAILED DESCRIPTION OF THE PREFERRED EMBODIMENTS

The preferred embodiments of the present invention will now be described with reference to FIGS. 1-6 of the drawings. Identical elements in the various figures are designated with the same reference numerals.

The invention disclosed herein includes systems and methods of modular construction of an electronically controlled aircraft, so that the basic aircraft may, by attaching one or more modules which enable an alternate source of control, later be upgraded to one with emergency control capacity. The upgraded apparatus may, during an emergency, be controlled by automated on-board equipment [including the autopilot(s), autothrottle(s) and flight control computer(s)—hereinbelow referred to as the "automated on-board flight control equipment"] or by a remote pilot. Hereinbelow, the automated on-board equipment and the remote pilot are referred to as the "alternate source of control."

Figure 1A:
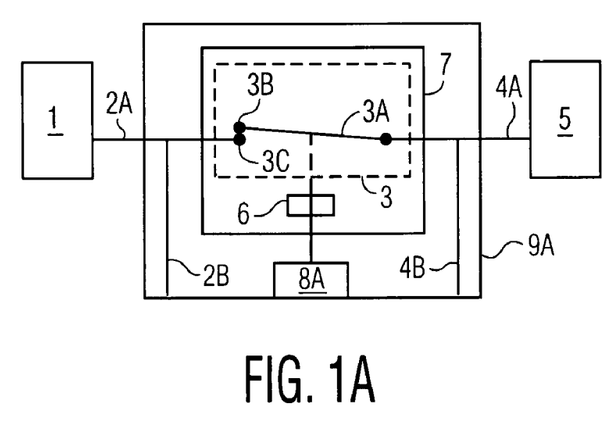
FIG. 1A is a representational block diagram of an aircraft control system comprising a control device responsive to on-board pilot actions; a controlled component for actuating an aircraft control surface, an engine throttle or the like; and an aircraft control module having an interruptible link which passes control signals from the control device to the controlled component.
Figure 1B:
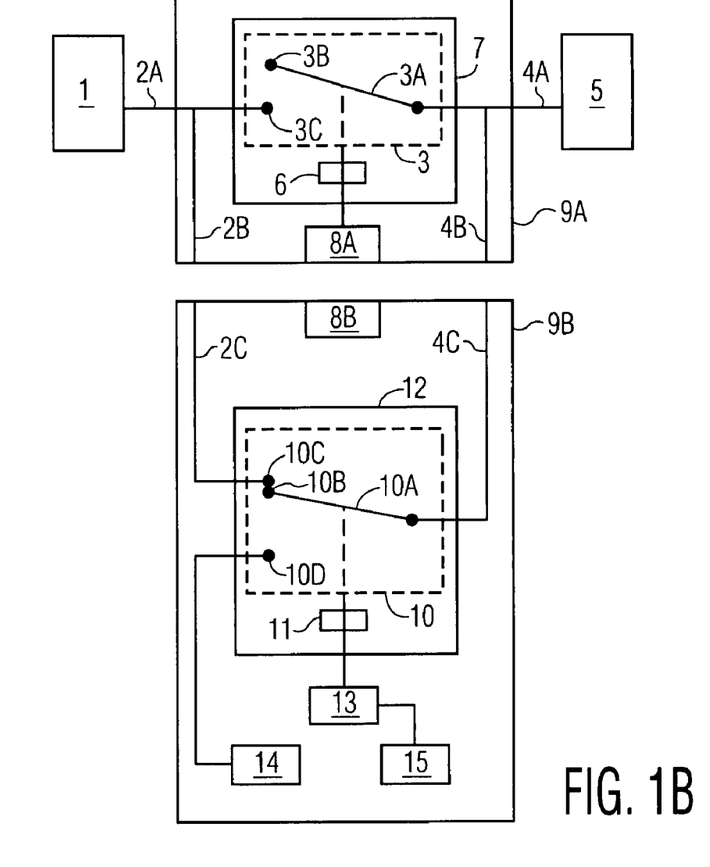
FIG. 1B is a representational diagram of the aircraft control system of FIG. 1A, with an alternate source of control module connectable to an aircraft control module.

FIGS. 1A and 1B show a highly schematized view of one embodiment of the modular system before (FIG. 1A) and after (FIG. 1B) attachment of the alternate source of control module (hereinbelow referred to as the "alternate source module") 9B to the aircraft control module 9A.

Referring to the aircraft control module 9A shown in FIG. 1A, electronically controlled component 5 aboard the aircraft is connected to on-board pilot control 1 by an interruptible electrical link 7 containing (a) switch 3 (consisting of elements 3A-3C) with pole 3A and contacts 3B and 3C, and (b) switching apparatus 6. Link 7 may be a SPST (single pole/single throw—terminology known in the art) relay, an electrical circuit which performs the function of a SPST relay, or any other electrical switching apparatus as is known in the art. Each of elements 2A and 2B is a wire, wires or other electrical signal conduit. 2A connects on-board pilot control 1 to link 7. Element 2B is in continuity with wire 2A, and extends to the periphery of 9A. Each of elements 4A and 4B is a wire, wires or other electrical signal conduit. 4A connects link 7 to the controlled component 5. Element 4B is in continuity with wire 4A, and extends to the periphery of 9A.

The controlled component may be any of:
(a) movable aircraft surfaces such as the flaps, ailerons, trim tabs, elevator, and the rudder;
(b) aircraft components with moving parts such as the throttles, other engine control components and devices, and the landing gear;
(c) any other electronically controlled aircraft components such as transmitters, receivers, transponders, lights and cockpit and cabin environmental controls; and
(d) the autopilot(s), autothrottle(s) and flight control computer(s). [Hereinbelow, reference to the singular form of any of "autopilot," "autothrottle" and "flight control computer" is intended to include either a single such device or a plurality of such devices. Reference to the autopilot/flight control system is intended to include the autothrottle.]

During operation of the apparatus 9A, shown in FIG. 1A in the "non-upgraded state" (i.e. without the attachment of apparatus 9B shown in FIG. 1B), switch 3 is closed, such that contact 3B is in electrical continuity with contact 3C. On-board pilot control signals pass from on-board pilot control 1 to wire 2A to contact 3C to contact 3B to pole 3A to wire 4A to controlled component 5. The state of switch 3 is determined by switching apparatus 6, which is controlled by the output of handshake unit 8A.

Referring to FIG. 1B, the "upgraded state" occurs when alternate source module 9B is attached to aircraft module 9A. Such attachment results in:
(a) the exchange of one or more handshake signals between handshake unit 8A of the aircraft module, and handshake unit 8B of the alternate source module;
(b) the opening of switch 3, such that electrical continuity/signal transmission through 3 does not occur (Hereinbelow, electrical continuity/signal transmission is referred to as "continuity.");
(c) continuity between 2B and 2C is established; 2C is a wire, wires or other electrical signal conduit, which connects 2B to link 12;
(d) continuity between 4B and 4C is established; 4C is a wire, wires or other electrical signal conduit, which connects 4B to link 12; and
(e) continuity (i) between 10B and 10C (on-board pilot control, see below, shown in FIG. 1B) or (ii) between 10B and 10D (resulting in alternate source control, see below).

Link 12 may be a SPDT (single pole/double throw—terminology known in the art) relay, an electrical circuit which performs the function of a SPDT relay, or any other electrical switching apparatus as is known in the art.

The handshaking process between 8A and 8B supplies information to one or both of these (a) about the initial connection between the aircraft module and the alternate control module, and (b) about the integrity of the connection at times after the initial connection (i.e. to avoid inadvertent separation of the two modules). Handshake signals may also be used to assure that the correct type of alternate source module (if there are different types of an alternate source module) has been connected to a particular aircraft module.

The handshaking process involves the exchange of one or more signals which may be:
(a) magnetic (e.g. involving a reed switch, as is known in the art);
(b) electric, in which case there would be a direct connection between 8A and 8B which carries the handshake information;
(c) electromagnetic (e.g. an RF or microwave signal; or an electromagnetic field encompassing a primary and a secondary transformer winding, with one winding in each of the two modules);
(d) optical or infrared;
(e) pressure-based (hydraulic or pneumatic); and
(f) acoustic.

Various handshake signal formats are possible including:
(a) a single handshake signal from 8B to 8A at the time of attachment of 9A and 9B;
(b) intermittent or continuous signals from 8B to 8A;
(c) a single handshake signal from 8B to 8A at the time of attachment of 9A and 9B, followed by a return signal from 8A to 8B;
(d) intermittent or continuous signals from 8B to 8A, each of which is followed by a return signal from 8A to 8B;
(e) a linked series of signals, such that a first signal from 8B to 8A, when received by 8A results in the generation of a second signal from 8A to 8B, which, when received by 8B results in the generation of a third signal from 8B to 8A, which, when received by 8A results in the generation of a fourth signal from 8A to 8B, etc.—with this process repeating on either an intermittent or continuous basis;
(f) processes involving more than one type of handshake signal, e.g. (i) a first type of handshake signal indicating that another handshake signal was received in an allotted time; and/or (ii) a second type of handshake signal indicating that another handshake signal was not received in an allotted time; etc.; and
(g) combinations of (a)-(f).

Other handshaking formats will be apparent to those skilled in the art.

Various responses to failed handshakes are possible including:
(a) one or more modules revert to a default format;
(b) one or more modules divert signals to a backup module;
(c) on-board pilot notification;
(d) off-aircraft pilot or administrator notification;
(e) system installer notification; and
(f) combinations of (a)-(e).

Module 9B has two possible operating states, each one of which corresponds to one of two possible positions of switch 10:
State α: With 10 positioned such that there is continuity between 10B and 10C, on-board pilot control signals are routed to the controlled component 5 via the path 1 to 2A to 2B to 2C to 10C to 10B to 10A to 4C to 4B to 4A to 5.
State β: With 10 positioned such that there is continuity between 10D and 10B, alternate source control signals are routed to the controlled component 5 via the path 14 to 10D to 10B to 10A to 4C to 4B to 4A to 5. In this State, on-board pilot control signals, if any, are not transmitted to a controlled component.

Alternate source of control signals may come from:
(a) an off-aircraft remote pilot (who may be on another aircraft or may be land- or sea-based), who transmits control signals to a receiver on the controlled aircraft (i.e. the aircraft on which the aforementioned modular equipment is installed); The receiver, along with decryption and decoding means (as described in U.S. Pat. No. 6,917,863) is included in element 14;
(b) the automated on-board flight control equipment, included in element 14.

The state of switch 10 is determined by switching apparatus 11, which is controlled by the output of state selecting apparatus 15. 15 may receive inputs from:
(a) on-board pilot-initiated takeover (or "PITO", as per U.S. Pat. No. 6,917,863) apparatus;
(b) off-aircraft remote-initiated takeover (or "RITO", as per U.S. Pat. No. 6,917,863) apparatus; and
(c) in some embodiments of the invention which allow return of command to the on-board pilot, off-aircraft "all-clear" signals.

Since the preferred embodiments of the invention entail the disabling of onboard pilot control of the aircraft, onboard pilot links to a wide variety of items must be disabled. This can be accomplished by methodology:
(a) wherein there are multiple interruptible links, one for each controlled component (e.g. a SPST relay within each link);
(b) wherein there is a single interruptible link, which handles all controlled components (e.g. a 30 pole/single throw relay); and (c) wherein there are multiple interruptible links, each of which handles more than one controlled component (e.g. 15 DPST [double pole/single throw] relays).

Although FIGS. 1A and 1B show a single line extending from 1 to 2A to 3 to 4A to 5, it is understood that in the case of electrical circuitry, a completed circuit requires a return connection between 5 and 1. The return:

(a) may or may not include switching means similar to that within 9A, either (i) within 9A utilizing (α) a double pole switching arrangement for switch 3, (β) a second switch similar to 3, (γ) a second link similar to 7, or (δ) a duplication of the contents of 9A shown in FIG. 1A; or (ii) separate from 9A, i.e. utilizing a second module functionally similar to 9A; or (b) may be part of a common "ground," a local "ground," a dedicated electrical line, or may utilize any other means as is known in the art.

The aforementioned considerations are applicable to all electrical circuits in each of the figures and to the discussion of each hereinbelow.

Modules 9A and 9B and/or interruptible links 7 and 12 may contain tamper-detecting and resisting apparatus. For example, an unauthorized person, attempting to (a) break a seal to gain access to a link and thereby restore onboard pilot control, or (b) reprogram a microprocessor-based link without an access code, would cause the institution of protective means such as:

(a) For a system in which switch 10 was in State α (on-board pilot control) prior to tamper detection, switch 10 would change position to State β (alternate source control);

(b) For a system in which switch 10 was in State β prior to tamper detection, possible system responses to tampering include (i) re-routing of controlled component control signals around the tampered-with link or module, or (ii) the application of additional irreversible connecting and disconnecting means to the tampered-with link; and (c) automatic notification of authorized persons of the tampering attempt.

Figure 2A:
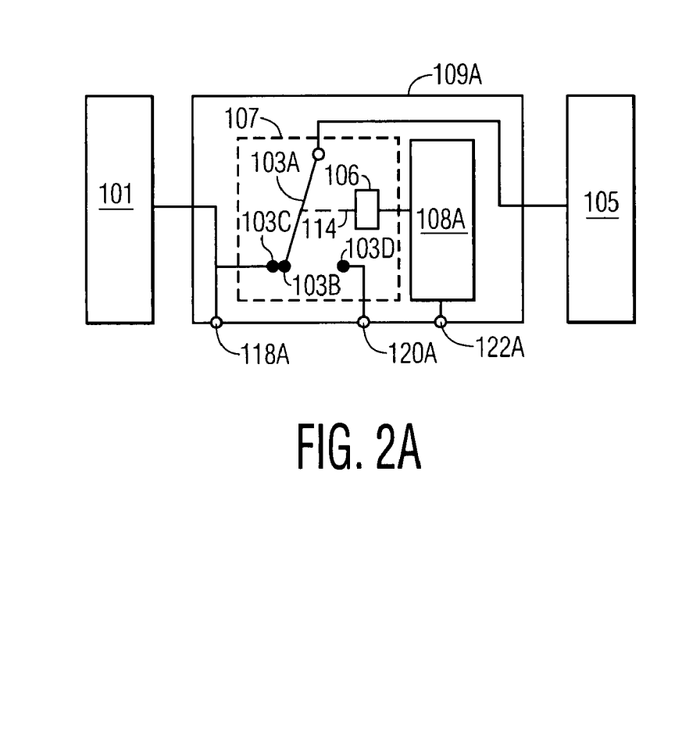
FIG. 2A is a representational block diagram of an aircraft control system with a modified aircraft control module with its interruptible link in the on-board pilot control position.
Figure 2B:
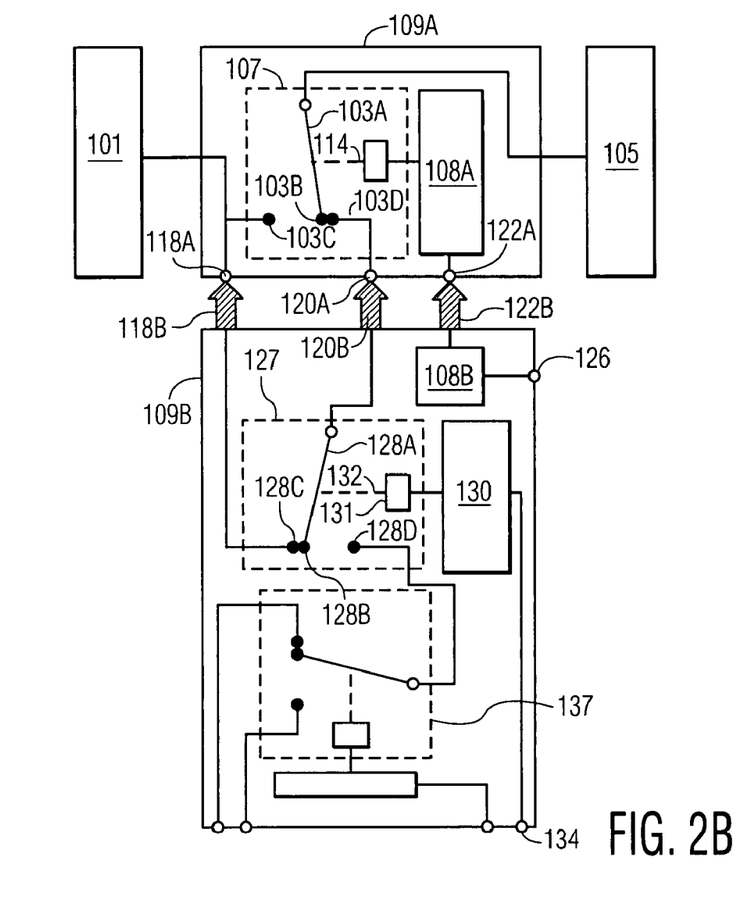
FIG. 2B is a representational block diagram of an aircraft control system with the aircraft control module of FIG. 2A and an alternate source of control module connected thereto.
Figure 2C:
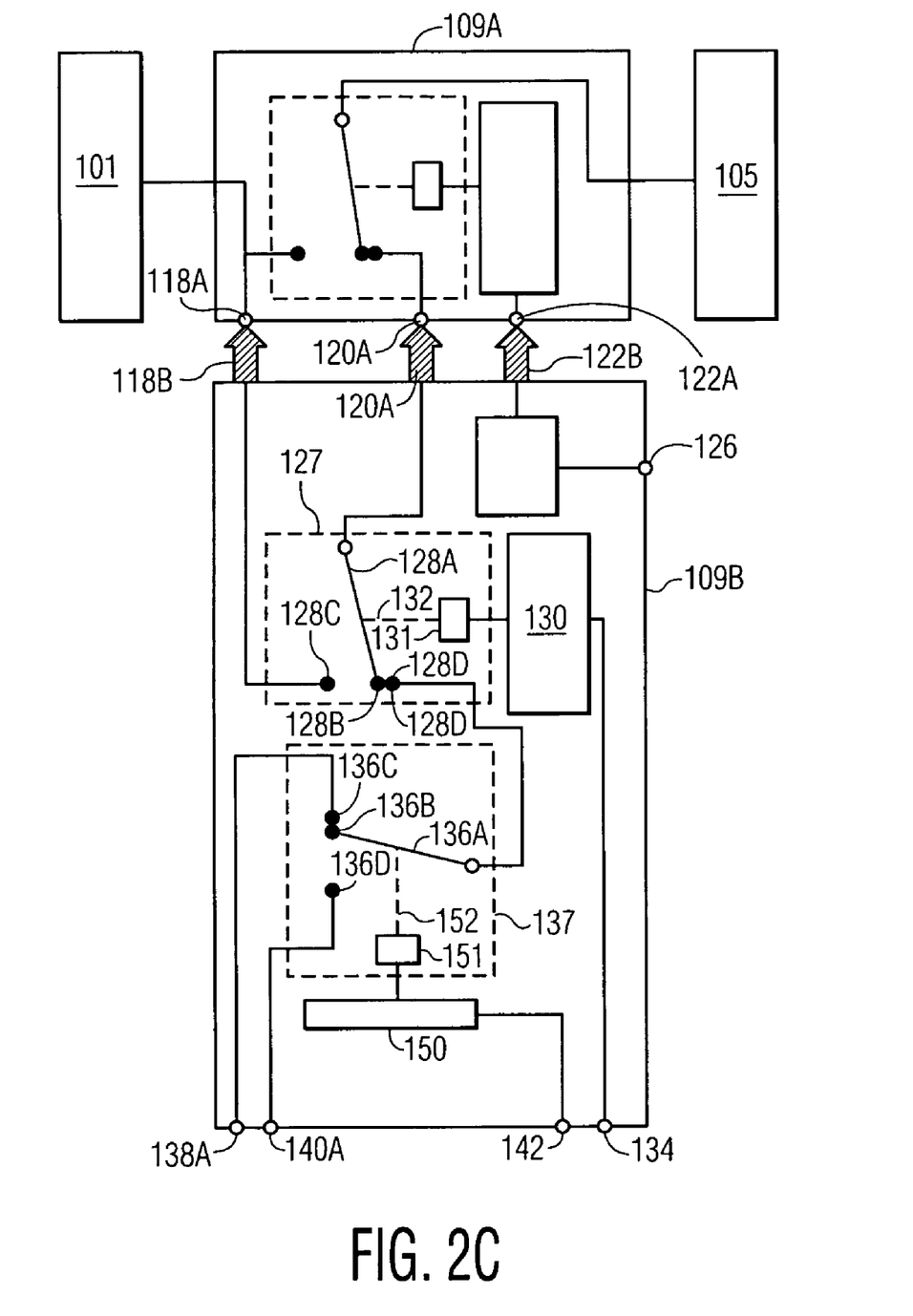
FIG. 2C is a representational block diagram of the aircraft control system of FIG. 2B with the interruptible links in the alternate source of control position.

FIGS. 2A, 2B and 2C, respectively, show another embodiment and detail of the system before and after plugging in of alternate control module 109B. These figures differ from FIGS. 1A and 1B, in that FIGS. 2A, 2B and 2C:

(a) contain a two position switch within the interruptible link 107 of the aircraft module;

(b) show (in FIGS. 2B and 2C) additional details of the switching arrangement 137 (i.e. the selection between (i) automated on-board flight control equipment and (ii) remote pilot) of the alternate source module not shown in FIG. 1B;

(c) show details of a possible arrangement of connections between the aircraft module and the alternate source module.

A plurality of electronically controllable components aboard the aircraft 105 each features an interruptible link 107, which electronically links the on-board pilot to each controlled component. The module 109A which contains this link accommodates a plug-in alternate source module 109B, shown in FIG. 2B. The act of plugging in 109B (and of plugging in such other additional modules as may be required, as discussed hereinbelow in conjunction with FIG. 3) upgrades the system to one with the capabilities of the anti-hijacking system disclosed in the aforesaid patent and application.

Referring to FIG. 2A, when the alternate source module has not been introduced, signals from on-board pilot control 101 pass through module 109A, via switch contacts 103C, 103B and associated switching element 103A to controlled component 105. In FIG. 2A, the switch comprising elements 103A-D, is shown in the position that is maintained in the absence of receipt of a handshake signal by handshake unit 108A. The position of switching element 103A is controlled by switch controlling means 106 through link 114, which may be mechanical, electronic, magnetic, electromagnetic or a data link. 106 is controlled by 108A. The switching means described herein, including 103A-D, 106 and 114, may include any of a wide variety of switching means as are known in the art, but in preferred embodiments of the invention allows for a one-time-only change of state. That is, once handshake unit 108A causes switch contacts 103B and 103C to open (such that a signal is no longer passed from 101 through 107 to 105), the opening is irreversible. Examples of such irreversible switching means are discussed hereinbelow, with regard to FIGS. 4-6. Other elements shown in FIG. 2A which are necessary for modular functionality when module 109B is attached include 103D, 118A, 120A and 122A; They are discussed hereinbelow, with regard to FIG. 2B.

FIG. 2B shows the attachment of anti-hijacking module 109B. The contents (and associated element numbers) of element 109A, to which 109B is attached, are the same as those of 109A in FIG. 2A. except for the change in the position of switching element 103A.

Elements 118B and 120B insert, respectively, into 118A and 118B. The 118A-118B and 120A-120B links need not be a direct "plug-in" of a male jack into a female. Other methods of mechanical and electronic linkage are possible; optical and infrared linkages are also possible.

Handshake unit 108B communicates with 108A by either a direct electronic link via jack 122B into receptacle 122A, or any of the methodologies discussed in conjunction with FIG. 1. Handshake-related telemetry from 108B may be directed through output port 126, allowing for display of the handshake status, and allowing confirmation that a proper initial handshake has occurred, and is maintained.

Receipt of an appropriate handshake signal by 108A causes 108A to signal 106 to change the switch position such that there is continuity between 103B and 103D, and loss of continuity between 103B and 103C.

After the attachment of module 109B to module 109A, interruptible link 127, comprising elements 128A-D, 131 and 132, determines whether controlled component 105 is controlled by the on-board pilot or by an alternate source of control. The position of switching element 128A is controlled by switch controlling means 131 through link 132 which may be mechanical, electronic, magnetic, electromagnetic or a data link. 131 is controlled by control unit 130, which receives signals through port 134. In the on-board pilot position (as shown in FIG. 2B, and as is the case for a non-hijacking situation), the switch allows control of the aircraft by the on-board pilot by signals that traverse the path: 101 to 118A to 118B to 128C to 128B to 128A to 120B to 120A to 103D to 103B to 103A to 105.

The remaining elements in the figure are discussed in conjunction with the events which take place during aircraft hijacking, in reference to FIG. 2C.

FIG. 2C shows the configuration of alternate source module 109B during an aircraft emergency/hijacking, after a takeover signal has issued, showing the change in the position of switching element 128A. A takeover signal (as discussed in U.S. Pat. No. 6,917,863, and hereinbelow in conjunction with FIG. 3) enters the alternate source module through input port 134, which inputs 130, which causes 131, through 132, to change the configuration of the switch comprising elements 128A-D from the configuration wherein there was continuity between 128B and 128C (shown in FIG. 2B) to the position wherein there is continuity between 128B and 128D (shown in FIG. 2C). This shifts control of 105 from on-board pilot control to the alternate source of control (signals inputted through 140A, and discussed below), i.e. either (a) the automated on-board flight control equipment or (b) the remote pilot.

The choice between the two alternate sources of control is determined by the state of switching means 137, comprising elements 136A-D, 151 and 152. When the automated on-board flight control equipment controls the aircraft, there is continuity between switch contacts 136B and 136C; Aircraft control signals enter the alternate source module through port 138A to 136C to 136B to 136A to 128D to 128B to 128A and thence over the aforementioned path from 128A to 105. When remote pilot signals control the aircraft, there is continuity between switch contacts 136B and 136D; Aircraft control signals enter the alternate source module through port 140A to 136D to 136B to 136A to 128D to 128B to 128A and thence over the aforementioned path from 128A to 105. The selection of the source of aircraft control (flight management computer system/autopilot vs. remote pilot) is determined by signals which enter through port 142, whose source may be an aircraft receiver (with decoding/decryption means), a flight management computer, or a source selecting unit. (See below in conjunction with FIG. 3.) The position of switching element 136A is controlled by switch controlling means 151 through link 152 which may be mechanical, electronic, magnetic, electromagnetic or a data link. 151 is controlled by control unit 150, which receives signals through port 142.

Switch 128A-D may be any of a wide variety of switches as are known in the art, but in preferred embodiments of the invention allows for a one time only change of state. That is, once 130 causes switch 128A-D to remove control from the onboard pilot (such that a signal is no longer passed from 128C to 128B), the change is irreversible. Examples of such irreversible switches are discussed hereinbelow, with regard to FIGS. 4-6.

In another embodiment of the invention, the contents of module 109B (except for handshake unit 108B) would be contained in module 109A (and 109B would not exist as an entity which is 'separable' from 109A). Enabling of the anti-hijacking system would not be based on adding another module. Instead, enabling would be caused by external application of a signal to handshake unit 108A.

In another embodiment of the invention, 109B is a separate module, which may be installed at the same time as 109A, or at a later time. In this embodiment, enabling of the anti-hijacking system requires an initial handshake input to 108A coming from a source other than 108B. Unit 108B could be present in this embodiment, allowing for ongoing continuous or intermittent confirmation of a proper link between 109A and 109B, once the initial handshake occurred.

Other modular arrangements are possible in which the contents of module 109B are distributed among more than one module, i.e. physically separate entity. One or more of these modules may be "plugged in" (physically, electrically, or by any of the other links discussed above) to 109A. One or more of these modules may be plugged in to each other.

Figure 2D:
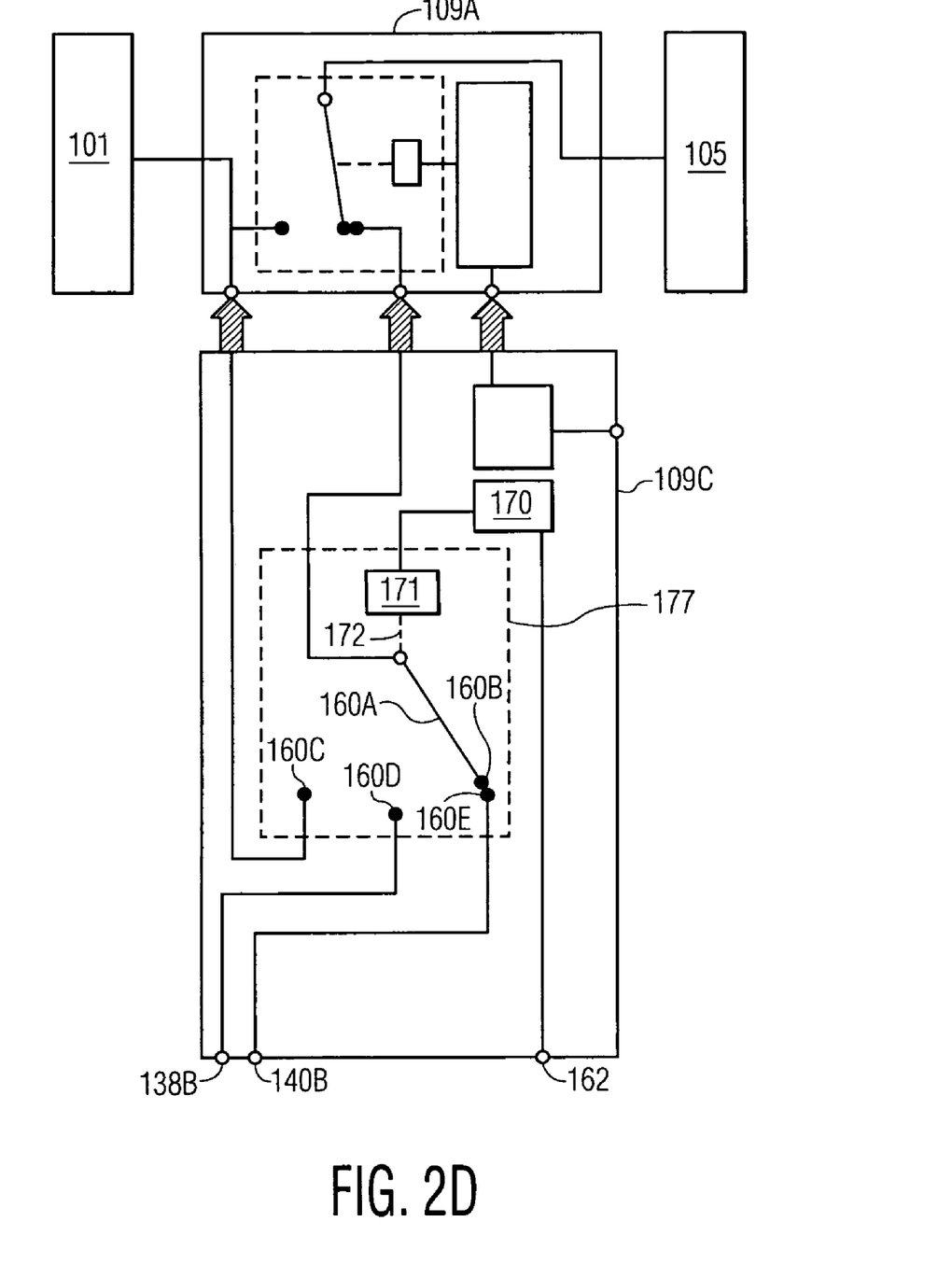
FIG. 2D is a representational block diagram of an aircraft control system having an aircraft control module with an interruptible link and an alternate source of control module which is modified from that of FIGS. 2B and 2C.

FIG. 2D shows a version of the alternate source module 109C in which interruptible link 127 and switching means 137 in (each in FIGS. 2B and 2C) are replaced by a single three position switching means 177, comprising elements 160A-E, 171 and 172. In this version, there is a corresponding need for fewer switch control elements. The position of switching element 160A is controlled by switch controlling means 171 (performing the functions of 131 and 151) through link 172 (performing the functions of 132 and 152) which may be mechanical, electronic, magnetic, electromagnetic or a data link. 171 is controlled by control unit 170 (performing the functions of 130 and 150), which receives signals through port 162 (performing the functions of 134 and 142). In a preferred embodiment of the invention switching means 177 includes both (i) an irreversible component, i.e. that involving switching from 160C/on-board pilot control, and (ii) a reversible component, i.e. that involving switching between 160D/automated onboard flight control equipment and 160E/remote pilot. The irreversible component may embody any of the irreversible switching arrangements shown in FIGS. 4-6 combined with reversible switching means, as is known in the art.

State setting signals arrive through port 162, which determine the position of switch 160A-E:

(a) When 160B and 160C are in continuity, on-board pilot signals from 101 are passed to the controlled component 105;

(b) When 160B and 160D are in continuity, automated on-board flight control equipment signals from 138B are passed to the controlled component 105; and (c) When 160B and 160E are in continuity, remote pilot signals from 140B are passed to the controlled component 105.

The combination (in FIG. 2C) of switches 128A-D and 136A-D perform the same function as that of 160A-E (in FIG. 2D).

Figure 3:
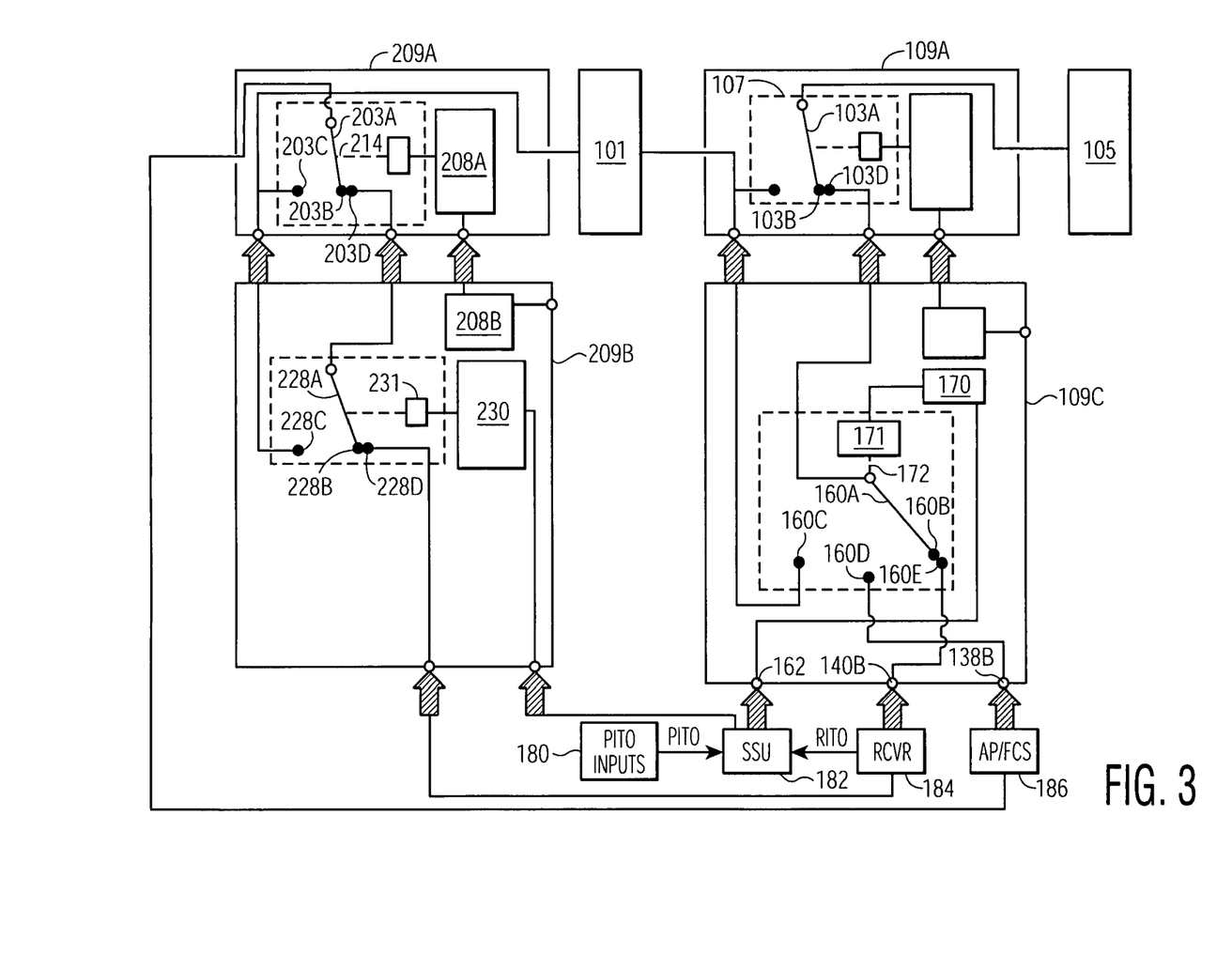
FIG. 3 is a representational block diagram of a modular hijacking prevention system with all of its various components.

FIG. 3 shows a schematic representation of a complete modular system for aircraft hijacking prevention and emergency takeover management. It includes:

(a) the apparatus shown in FIG. 2D, i.e., an aircraft control module and an alternate source module, to interrupt on-board pilot access to controlled components;

(b) apparatus similar to that shown in FIG. 2B, utilized herein to interrupt onboard pilot access to the automated on-board flight control equipment;

(c) a receiver 184, for receiving remote pilot control signals;

(d) an autopilot/flight control system 186;

(e) PITO inputs 180; and (f) a source selecting unit (SSU) 182.

On-board pilot controls 101 include (i) controlled components 105 other than the autopilot/flight control system and (ii) the autopilot/flight control system, with which the pilot may input the automated flight control equipment. On-board pilot access to 105 through modules 109A and 109C is schematically identical to that discussed hereinabove with regard to the apparatus in FIG. 2D. (The connections to 138B, 140B and 162 are shown in FIG. 3 with a different spatial arrangement than in FIG. 2D, only to facilitate geometrical/design considerations in FIG. 3; Nevertheless, functionally, 109C in each of the figures is identical.)

On-board pilot access to the autopilot/flight control system input is through interruptible link 209A, which is functionally identical to 109A. The alternate source module 209B which plugs in to 209A is similar to that shown in FIG. 2B, but contains only one switching element. 209B allows control of the autopilot/flight control system to be taken away from the on-board pilot and transferred to the remote pilot, upon the receipt of a signal from SSU 182 indicating either PITO or RITO.

In the non-upgraded state, on-board pilot control signals for the autopilot/flight control system pass from 101 to 203C to 203B to 203A to 186.

As shown in FIG. 3, upgrading an aircraft that was initially built with 109A and 209A modules, so that it has the full hijacking prevention system would require:
(a) the installation of 109C and 209B modules as described hereinabove and hereinbelow;
(b) the installation of receiver 184 and source selecting unit 182, with a connection from 184 to 182;
(c) the connection of each of 182 and 184 to a 209B module and a 109C module (or, as indicated above, a multiplicity of 109C modules, with as many as one for each controlled component);
(d) the installation of PITO inputs, as discussed in U.S. Pat. No. 6,917,863, including but not limited to keyboard, buttons, switches, microphones, etc., which would be installed and linked to 182 as indicated in FIG. 3; and
(e) connecting the output of the autopilot/flight control system 186 to port 138B.

Upgrading the aircraft results in:
(a) Handshake unit 208B signaling 208A which causes the switch controlling apparatus to change the position of switch 203A-D to one (as shown in the figure) in which (i) continuity between 203B and 203D is established and (ii) continuity between 203B and 203C is eliminated. The result of this, is that during a non-hijacking state, the on-board pilot control signals for the autopilot/flight control system pass from 101 to 228C to 228B to 228A to 203D to 203B to 203A to 186; and
(b) A sequence of events parallel to that discussed immediately above such that the connection of module 109C to 109A results in a change of switch position in link 107, such that (as shown in the figure) the on-board pilot is thereafter linked to controlled components 105 via the path 101 to 160C to 160B to 160A to 103D to 103B to 103A to 105.

A hijacking is signaled by either
(a) a PITO signal from 180 (as discussed in U.S. Pat. No. 6,917,863); or
(b) a RITO signal received by 184.

Either of these signals causes source selecting unit 182 to:
(a) remove on-board pilot control; and
(b) substitute an alternate source of control, i.e. either (i) the autopilot/flight control system or (ii) the remote pilot. (The choice of (i) vs. (ii)—initially, and later on in the flight—is the subject of U.S. Pat. No. 6,917,863 and U.S. patent application Ser. No. 10/919,169.)

The aforementioned occurs when source selecting unit 182:
(a) signals control unit 170 which causes switch control means 171 to change the state of switch 160A-E to one (as shown in the figure) in which (i) electrical continuity between 160B and 160C is eliminated, and (ii) electrical continuity between 160B and either 160D (autopilot/flight control system control) or 160E (remote pilot control) is established; and
(b) signals control unit 230 which causes switch control means 231 to change the state of switch 228A-D to one (as shown in the figure) in which (i) electrical continuity between 228B and 228C is eliminated, and (ii) electrical continuity between 228B and 228D is established.

The results of the change of state are:
(a) either (i) remote pilot signals are used to control the aircraft, via the signal path 184 to 140B to 160E to 160B to 160A to 103D to 103B to 103A to 105; or (ii) autopilot/flight control system signals are used to control the aircraft, via the signal path 186 to 138B to 160D to 160B to 160A to 103D to 103B to 103A to 105; and
(b) the remote pilot may control the autopilot/flight control system on the hijacked aircraft by signals from 184 to 228D to 228B to 228A to 203D to 203B to 203A to 186.

Variations of the system shown in FIG. 3 include but are not limited to:
(a) a system in which any two or more of 180, 182, 184, 186, 109C and 209B are combined into a single module; in the case where 109C and 209B are combined (with or without the combination of 180, 182, 184 and/or 186), 109A and 209A may also be combined with each other;
(b) a system in which 109C is substituted with 109B, i.e. in which the three-position switch 160A-E is replaced with two two-position switches 128A-D and 136A-D; In this case the 182 output would input 150 through port 142, and would input 130 through port 134;
(c) a system in which the remote pilot and one or more of (i) the autopilot (ii) the autothrottle and (iii) the flight control system may simultaneously be connected to allow control of the controlled component; In this case, an hierarchical system—e.g. whereby remote pilot commands take precedence over those of the autopilot may be a feature of the embodiment; and
(d) a system in which one or more of the signal transmission paths is either (i) a fluid filled tube (i.e. a hydraulic or pneumatic system); (ii) a mechanical linkage [consisting of one or more (α) rigid mechanical members, (β) cables, belts and/or pulleys, and (γ) springs]; and/or (iii) a data link.

The relationship between "Master Aircraft Control" shown in FIG. 13 of U.S. Pat. No. 6,917,863 (and FIG. 16 of U.S. patent application Ser. No. 10/919,169) and the elements shown herein is as follows: Master Aircraft Control of the aforementioned patent and patent application performs both:
(a) the overall selection of control source (i.e. on-board pilot vs autopilot/flight control system vs. remote pilot) performed by source selection unit 182 of FIG. 3, herein, and
(b) the execution of the aforementioned selection, i.e. the switching of each controlled component 105 to the selected control source, performed by (one or more of each of) 170 and 177 (or, in the case of the system configuration shown in FIG. 2C, performed by [one or more of each of] 130, 127, 150 and 137).

A fourth control choice (besides onboard pilot, remote pilot and autopilot/flight control system) is defined in U.S. Pat. No. 6,917,863 (and in U.S. patent application Ser. No. 10/919,169), referred to therein as MAC State 4. This state, in which only a highly restricted set of aircraft operations is permitted, may be selected upon aircraft landing after a hijacking or an in-flight emergency has occurred, to prevent the aircraft from taking off again before the emergency condition has been resolved. In this state, for example, the aircraft engine controls may be inhibited to prevent the engines from being accelerated to take-off power (or even to taxiing power). Configuring the system described herein to accommodate such a fourth, restricted operations state could be accomplished by more complex switching arrangements, as will be obvious to those skilled in the art.

Variations on configuration of the control apparatus for switch 160A-E include:
(a) a system in which there is no discrete 182 unit (either as a stand-alone unit or as part of another unit), but in which the source of aircraft control (and hence the position of switch 160A-E is determined (i) by PITO signals, (ii) by RITO signals, (iii) by (i) and/or (ii), or (iv) by a processed version of PITO and/or RITO signals where processing may entail (α) the use of logic circuitry and/or (β) the use of other inputs (e.g. pilot integrity assessment, global positioning, and clock);

(b) a system in which the function of (i) 182 and 170, (ii) 170 and 171/172, (iii) 171/172 and 160A-E, (iv) 182, 170 and 171/2, (v) 170, 171/2 and 160A-E, or (vi) 182, 170, 171/2 and 160A-E is amalgamated such that a single component or group of components performs their function; and (c) a system in which the function of (i) 182 and 230, (ii) 230 and 231, (iii) 231 and 228A-D, (iv) 182, 230 and 231, (v) 230, 231 and 228A-D, or (vi) 182, 230, 231 and 228A-D is amalgamated such that a single component or group of components performs their function.

A list, analogous to that of the three aforementioned variations in the configuration of the control apparatus, is obvious for the case for the two-switch module 109B, in which 130 and 150 replace 170, 131/132 and 151/152 replace 171/172 and in which 128A-D and 136A-D replace 160A-E.

FIGS. 4A to 4E show a variety of switching arrangements that can afford irreversible switch opening (4A-4C 4E, 5A, 5B and 6A/B) or irreversible closing (4D, 4E, 5A and 5B). The switching performed by the apparatus shown in FIGS. 4A-E, 5A-B and 6A-B may be considered to be "irreversible," if the apparatus is located in a position to which access is denied or to which access is effectively impossible during the flight of an aircraft. It is understood that, "absolute irreversibility" (i.e. irreversible switching that could not even "in principle" be reversed), is a theoretical impossibility, but "practical irreversibility" (i.e. switching that could not be reversed by any extremely creative or aggressive means) is an achievable endpoint. The terms "irreversible" and "irreversibly" hereinabove and hereinbelow are intended to denote the concept of practical irreversibility defined herein.

Figure 4A:
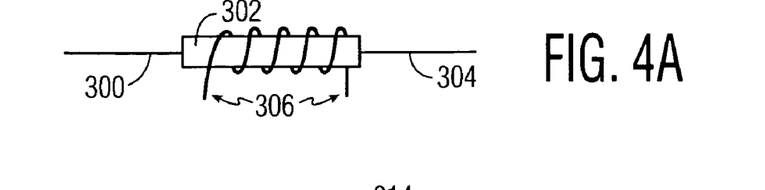
FIGS. 4A-4E are representational diagrams of interruptible links, each diagram showing a different preferred embodiment.

FIG. 4A shows non-temperature sensitive conductive elements 300 and 304 linked by temperature sensitive conductive element 302. Upon application of an electric current to coil 306, coil 306 gets hot, and the heat melts element 302, resulting in an irreversible opening of the electrical connection between 300 and 304.

Figure 4B:
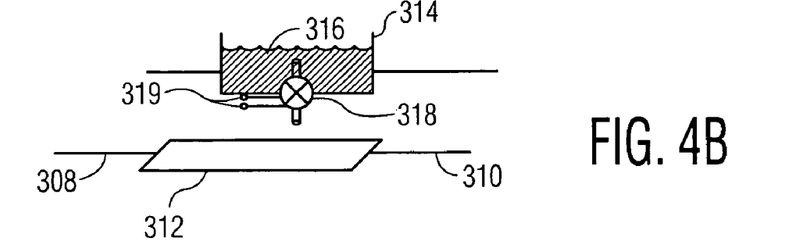

FIG. 4B shows conductive elements 308 and 310 linked by chemically sensitive conductive element 312. The application of electrical current via wires 319 to valve 318 causes it to open, releasing corrosive liquid 316 stored in reservoir 314 onto the surface of 312. The corrosive liquid dissolves 312, resulting in an irreversible opening of the electrical connection between 308 and 310. An example of a 312, 316 pair would be metallic zinc or magnesium, and sulfuric acid.

Figure 4C:
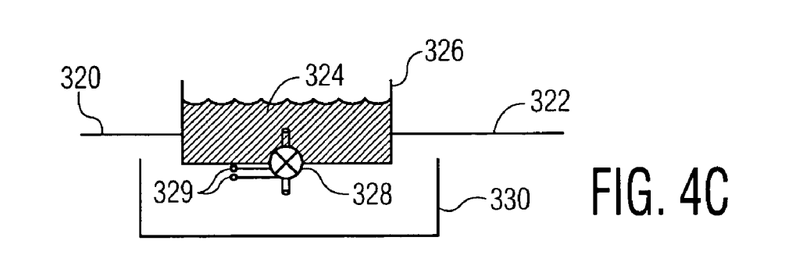

FIG. 4C shows conductive elements 320 and 322 linked by a bath of elemental mercury or other electrically conductive or partially conductive liquid 324 contained in container 326. The application of electrical current via wires 329 to valve 328 causes it to open, releasing the mercury or other conductive liquid into container 330, resulting in an irreversible opening of the electrical connection between 320 and 322. In the case of a partially or weakly conductive liquid (such as saline), a small current flow through the liquid could be amplified and used to control a switching device by means that are known in the art.

Figure 4D:
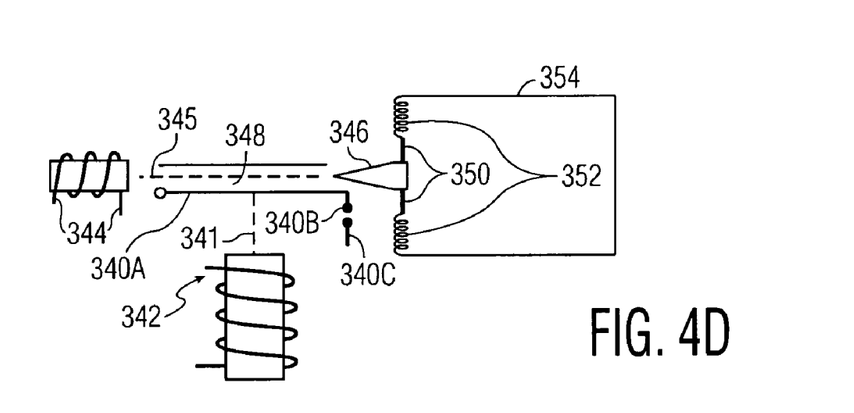

FIG. 4D shows an electrical relay which may be irreversibly locked in one position. Application of electrical current to coil 342 pulls 341, switching element 340A downwards in the figure, so that contacts 340B and 340C are touching, resulting in the closing of a circuit which links 340A to 340C. The closing is rendered irreversible when current is applied to coil 344, which pulls, via 345, locking element 346 leftwards in the figure, so that its right-most edge is to the left of the vertical line defined by pins 350. These pins are spring-loaded by springs 352; One end of each spring has its position fixed by housing 354. Once the right-most edge of 346 has been pulled to the left of the line defined by pins 350, the pins are moved by their respective springs such that the lower edge of the upper pin moves downwards and the upper edge of the lower pin moves upward, preventing rightward motion of 346 and locking it into channel 348. This locks switch 340 (defined as the combination of 340A, 340B and 340C) in the closed position (defined as continuity between 340B and 340C). Links 341 and 345 may be mechanical or electromagnetic. Reference in the aforementioned description to "right", "left", "up" and "down" are non-specific, and only for the purpose of explanation; the elements in the figure may be rotated, reflected or otherwise realigned in any way that preserves the function of those elements.

Other switching arrangements which could be used to produce irreversible switching based on the design features shown in FIG. 4D include:

(a) a version of the arrangement in FIG. 4D in which the mechanical locking of a relay is enabled when the relay contacts are in the open position, thereby permanently holding a switch analogous to 340A-C in the open position; and (b) a version of the arrangement in FIG. 4D in which the relay is replaced by an electromechanical two or more position "stepping switch," with an electromechanically controlled locking arrangement analogous to that shown in FIG. 4D.

Figure 4E:
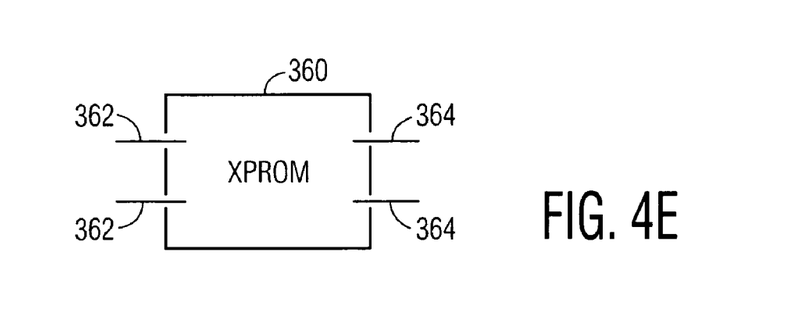

FIG. 4E shows a read-only-memory-based version of an irreversible switch. Element 360, "XPROM" may be a PROM (programmable read only memory), an OTPROM (one time programmable read only memory), an EPROM (erasable programmable read only memory), or another type of programmable read only memory as is known in the art. One or more inputs 362 may be used to program the memory on a one-time-only basis, the results of which are reflected in outputs 364. One or more 360 may serve the function of one or more interruptible links 7, 12 and 107 and 127, and may serve as the irreversible component of switching means 177.

Figure 5A:
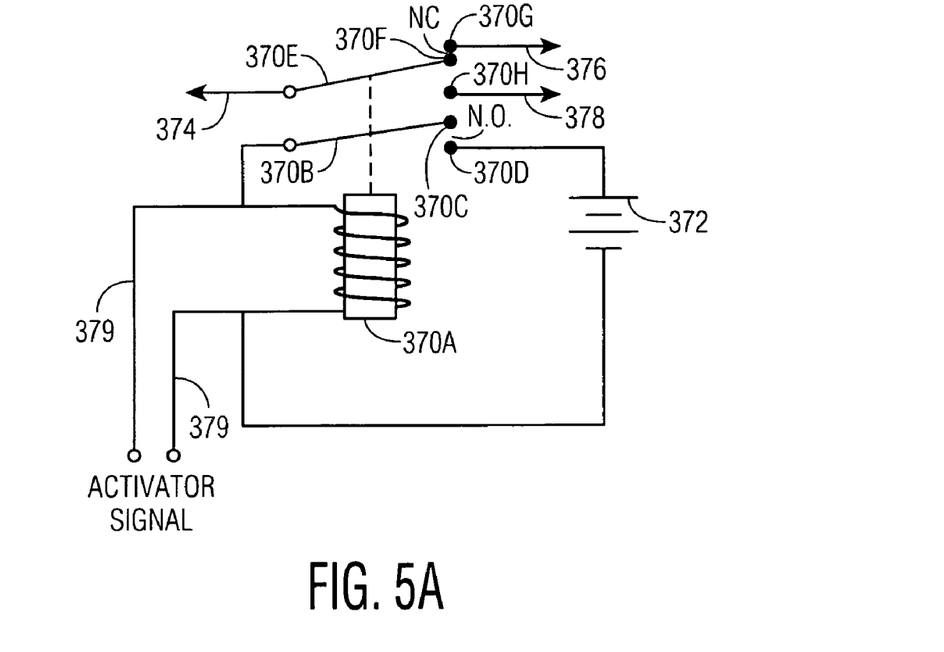
FIGS. 5A and 5B are schematic representational diagrams of interruptible links, each diagram showing a further preferred embodiment.

FIG. 5A shows a relay-based circuit which allows a form of irreversible switching. The relay comprises electromagnet 370A, poles 370B and 370E, and contacts 370C, 370D, 370F, 370G and 370H.

In State 1, i.e. prior to activation, the relay contacts are positioned as shown in the figure; As a result, element 374 is in electrical continuity (through normally closed [N.C. in the figure] contacts 370F and 370G) with element 376. In State 2, i.e. following activation, the relay contacts are positioned such that element 374 is in electrical continuity (through normally open [N.O. in the figure] contacts 370F and 370H) with element 378.

The arrangement of 374, 376 and 378 is capable of performing the switching performed by the switch comprising 103A-D in FIG. 2A, i.e. switching the control of controlled components 105 from a direct connection to the on-board pilot control 101, to a connection through alternate control module 109B. In this arrangement:

370E is analogous to 103A,
370F is analogous to 103B,
370G is analogous to 103C,
370H is analogous to 103D, 374 is analogous to the connection to 105 (the controlled component), 376 is analogous to the connection to 101 (the on-board pilot control), and 378 is analogous to the connection to 120A (which goes to the alternate control module).

The irreversible transition from State 1 to State 2 occurs when an activator signal is applied through wires 379, which activates the relay such that the normally open contacts close. This results in a flow of current through the circuit which comprises (i) battery or power supply 372, (ii) relay electromagnet 370A and relay contacts 370B, 370C and 370D. Once contacts 370C and 370D are in electrical continuity, relay closure is self-perpetuating, even in the absence of the activator signal.

Figure 5B:
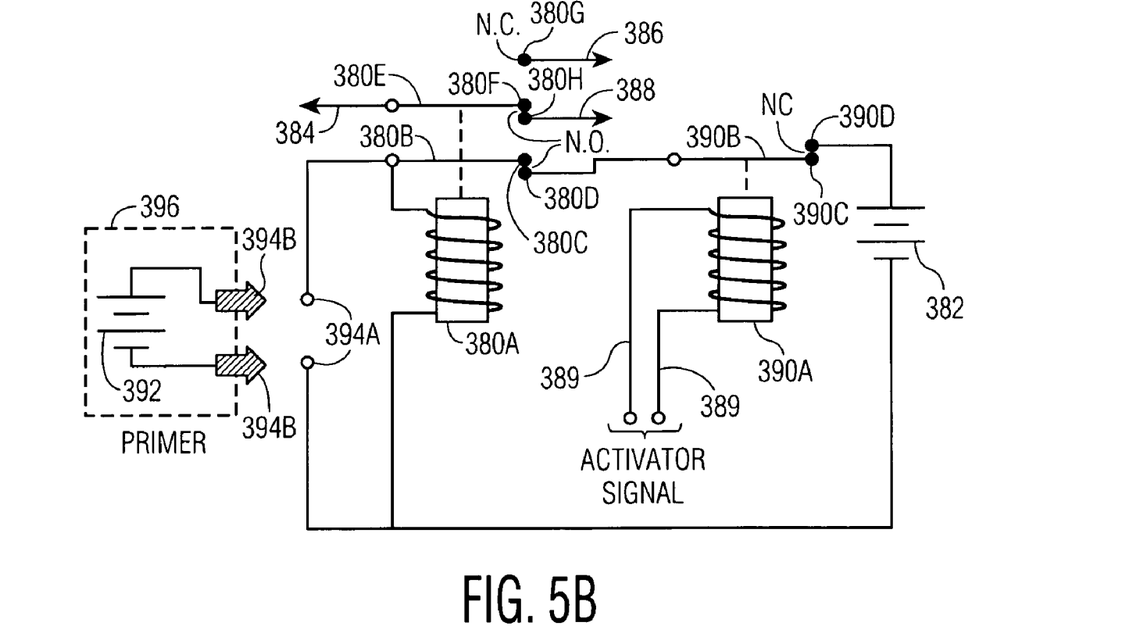

FIG. 5B shows another relay-based circuit which allows a form of irreversible switching. A first relay comprises electromagnet 380A, poles 380B and 380E, and contacts 380C, 380D, 380F, 380G and 380H.

In State 1, i.e. prior to activation, the first relay contacts are positioned as shown in the figure; As a result, element 384 is in electrical continuity with element 388, through closed (but normally open [N.O. in the figure] contacts 380F and 380H). In State 2, i.e. following activation, the relay contacts are positioned such that element 384 is in electrical continuity (through normally closed [N.C. in the figure] contacts 380F and 380G) with element 386.

The arrangement of 384, 386 and 388 is capable of performing the switching performed by switch 103 in FIG. 2A, i.e. switching the control of controlled components 105 from a direct connection to the on-board pilot control 101, to a connection through alternate control module 109B. In this arrangement:

380E is analogous to 103A, 380F is analogous to 103B, 380G is analogous to 103D, 380H is analogous to 103C, 384 is analogous to the connection to 105 (the controlled component), 386 is analogous to the connection to 101 (the on-board pilot control), and 388 is analogous to the connection to 120A (which goes to the alternate control module).

The circuit shown in FIG. 5B requires initial activation by a "primer," 396 i.e. a source of electric current which momentarily closes the normally open contacts 380C and 380D of the first relay. As shown in the figure, 396 comprises a battery or other electric power source 392 and contacts 394B. The priming of the irreversible link shown in FIG. 5B occurs when contacts 394B are in electrical continuity with contacts 394A, which results in the closure of first relay contacts 380C and 380D. This closure is self perpetuating (after the removal of the primer) as a result of the flow of current through the circuit which comprises (i) battery or power supply 382, (ii) contacts 390C and 390D of the second relay, (iii) pole 390B of the second relay, (iv) contacts 380C and 380D of the first relay, (v) pole 380B of the first relay, and (vi) relay electromagnet 380A. Contacts 394A are situated in a location to which access is impossible during the course of an aircraft flight. They may be further protected by tamper-proof seals (discussed hereinabove), a mechanical or electrical lock, or a password-based system as is known in the art.

The irreversible transition from State 1 to State 2 occurs when an activator signal is applied through wires 389, which activates a second relay comprising elements 390A-D such that its normally closed contacts 390C and 390D open. This results in the interruption of the flow of current through the circuit which comprises (i) battery or power supply 382, (ii) contacts 390C and 390D of the second relay, (iii) pole 390B of the second relay, (iv) contacts 380C and 380D of the first relay, (v) pole 380B of the first relay and, (vi) relay electromagnet 380A. Once contacts 380C and 380D are no longer in electrical continuity, that state is self-perpetuating, even in the absence of the activator signal.

Each of (i) the switching function performed by elements 374, 376 and 378, and (ii) the switching function performed by elements 384, 386 and 388 may also:

(a) perform the switching performed by the switch 10 in FIG. 1B;

(b) perform the switching performed by the switch comprising 128A-D in FIG. 2B;

(c) perform the switching performed by the switch comprising 136A-D in FIG. 2C and (d) be used in conjunction with switch 160A-E in FIG. 2D to lock out contact with 160C, and thereby irreversibly prevent on-board pilot control.

A simplified version of the apparatus shown in FIGS. 5A and 5B may also perform the function of switch 3 in FIG. 1A.

The relay-based apparatus shown in FIGS. 5A and 5B could be replaced by semiconductor-based switching apparatus which functions in an analogous manner, as is known to those skilled in the art. An example of such semiconductor-based analogous apparatus, with regard to the apparatus shown in FIG. 5B, would be a multivibrator circuit, with feedback from one of the circuit outputs to one of the circuit inputs, such that: once the circuit changes from State 1 to State 2, an output produces feedback which locks the circuit into State 2.

Figure 6A:
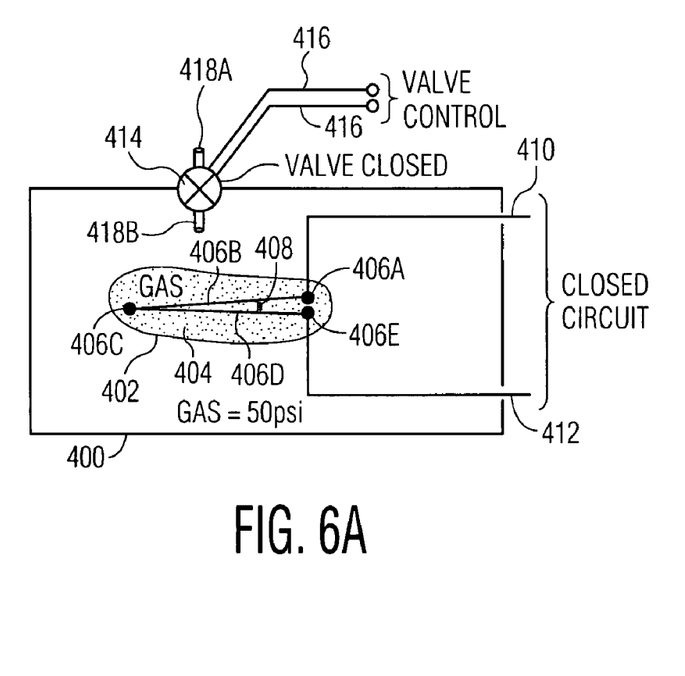
FIGS. 6A and 6B are a representational diagram of still another preferred embodiment of an interruptible link.
Figure 6B:
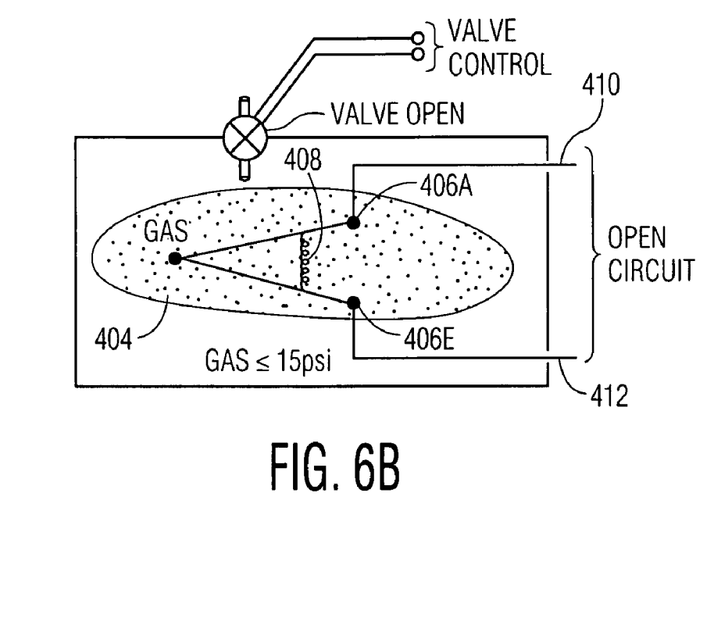

FIGS. 6A and 6B show an apparatus for irreversibly opening a switch, wherein switch opening is triggered by the release of a gas under pressure, from a closed container. The gas 404, when under pressure (FIG. 6A), holds closed a pair of electrical contacts 406A and 406E, thereby closing the controlled circuit consisting of 410, 406A, 406E and 412. After pressure is released, by the opening of valve 414 (FIG. 6B), a spring 408 forces the electrical contacts apart, thereby opening the controlled circuit.

Referring to FIG. 6A, 400 represents a closed chamber containing a gas under sufficient pressure to cause a balloon-like gas-filled structure 402 to collapse, so that the inward force of 402 overcomes the outward force of spring 408 on non-conductive members 406B and 406D, resulting in elements 406A and 406E touching. 406B and 406D are held in position by fastening element 406C. An electrical signal applied to 416 causes valve 414 to open, with the venting of gas from within 400 through 418B, through 418A to the region outside of 400, where it is understood that the gas pressure is less than that inside of 400, prior to the opening of 414. The result of the venting of the pressurized gas in 400 is (a) a fall in the pressure within 400, (b) a resultant expansion of the gas 404 contained in structure 402, and (c) the inward force of 402 no longer overcoming the outward force of spring 408 on non-conductive members 406B and 406D, resulting in elements 406A and 406E moving apart so that they no longer touch.

The gas pressures indicated in the figure are intended to be an example, showing the decrease in the pressure within 400 following valve opening. In practice, a wide range of pressures are possible. The gas within 402 may be the same as, or different from, the gas within 400.

In another embodiment of the apparatus shown in FIGS. 6A and 6B, the gas which fills chamber 400 in FIG. 6A is substituted with a pressurized liquid in which a gas has been dissolved (e.g. water with dissolved carbon dioxide under pressure). Valve 414 would be positioned so that its opening would allow the release of liquid and gas, thereby allowing the expansion of 402 and the separation of contacts 406A and 406E.

Multiple other embodiments of this feature of the invention, including two- and three-dimensional versions of the design, and other design arrangements in which gas release cause a mechanical displacement which opens and/or closes a switch, will be apparent to those skilled in the art.

The switching arrangement of 406A and 406E is capable of performing the switching performed by switch 3 in FIG. 1A, i.e. eliminating electrical continuity between controlled components 105 and on-board pilot control 101, through 9A. In this arrangement:

- 406A is analogous to 3B,
- 406E is analogous to 3C,
- 410 is analogous to 4A (connecting to 5, the controlled component), and
- 412 is analogous to 2A (connecting to 1, the on-board pilot control).

A version of this embodiment which causes the irreversible closing of a switch could be achieved by either: (a) a different geometrical arrangement of the switch contacts, so that the extension of spring 408 causes 406A to touch another contact and thereby close a circuit; or (b) placing an inverter circuit in series with 410-406A-406E-412, such that the opening of 410-406A-406E-412 causes the closing of another switch, and such that the closing of 410-406A-406E-412 causes the opening of that other switch. The techniques and apparatus necessary to perform irreversible switch closing by these methods will be apparent to those skilled in the art. By combining (a) the aforementioned design features which cause irreversible switch closing, with (b) the design features shown in FIGS. 6A and 6B which cause irreversible switch opening, a SPDT (single pole/double throw) switching arrangement is obtained. Such SPDT switches featuring an irreversible change of switch state may perform the function of switches 10, 128A-D and 136A-D. A more complex version of the aforementioned apparatus may perform the function of switch 160A-E in FIG. 2D, as will be apparent to those skilled in the art.

Other switching arrangements which could be used to produce irreversible switching, not shown in FIGS. 4-6, will be apparent to those skilled in the art.

What is claimed is:

1. Apparatus for disabling operation of an aircraft by an on-board pilot, said aircraft having an aircraft control system for controlling at least one controlled component including at least one of (i) an aircraft engine throttle and (ii) an aircraft attitude control surface, said aircraft control system actuating said at least one controlled component in response to one of (i) first control signals received from a control device manually actuated by the onboard pilot and (ii) second control signals received from at least one alternate source of control, said apparatus comprising, in combination:

(a) a first control module having an interruptible link which passes said first control signals from said control device to said aircraft control system, said first control module including first connecting means for (i) interrupting said link and (ii) directing said first control signals to a second control module; and (b) a second control module adapted to be connected to said first control module and including second connecting means, responsive to third control signals, for connecting one of (i) said first control signals received from said first control module and (ii) said second control signals received from said at least one alternate source of control to said aircraft control system for control of said controlled component;

wherein, said first connecting means is responsive to the act of connection of said second control module to said first control module to (a) interrupt said link, (b) direct said first control signals to said second connecting means and (c) connect said aircraft control system to said second connecting means; and wherein said third control signals cause said second connecting means to select said second control signals to pass to said aircraft control system for controlling the controlled component.

2. The apparatus defined in claim 1, wherein at least one of said first control module and said second control module includes a handshake unit that detects when the two modules are properly connected together.

3. The apparatus defined in claim 2, wherein each of said first control module and said second control module includes a respective handshake unit, said first handshake unit of said first module being adapted to be coupled to said second handshake unit of said second module when the two modules are connected together, said first and second handshake units being operative to exchange at least one signal for detecting when said modules are properly connected together.

4. The apparatus defined in claim 1, wherein said first connecting means for interrupting said link, which passes said first control signals from said control device to said aircraft control system, includes means for restoring said link in response to fourth control signals.

5. The apparatus defined in claim 1, wherein said first connecting means for interrupting said link, which passes said first control signals from said control device to said aircraft control system, includes means for irreversibly interrupting said link.

6. The apparatus defined in claim 5, wherein said irreversibly interrupting means includes means for chemical dissolution of an electrical connection for the transmission of said first control signals.

7. The apparatus defined in claim 5, wherein said irreversibly interrupting means includes means for removing an electrically conductive liquid from an electrically conducting reservoir, said liquid forming an electrical conductor for the transmission of said first control signals, said removal thereby rendering said reservoir non-conductive.

8. The apparatus defined in claim 5, wherein said irreversibly interrupting means includes a meltable electrical conductor for the transmission of said first control signals and means for melting said conductor.

9. The apparatus defined in claim 5, wherein said irreversibly interrupting means includes means for programming a write-once memory of a logic circuit.

10. The apparatus defined in claim 5, wherein said irreversibly interrupting means includes means for permanently interrupting at least one of (a) a fluid line, (b) a mechanical cable and (c) a mechanical link.

11. The apparatus defined in claim 5, wherein said irreversibly interrupting means includes means for at least temporarily interrupting an electrical energy supply to a relay to open a normally open contact of said relay, said energy supply being routed through said normally open contact when it is closed by said relay thereby causing said relay to retain said contact in the closed position as long as electrical energy is supplied to said relay.

12. The apparatus defined in claim 5, wherein said irreversibly interrupting means includes means for temporarily supplying electrical energy to a relay to close a normally open contact of said relay, said energy supply being routed through said contact when it is closed by said relay, thereby causing said relay to retain said contact in the closed position as long as electrical energy is supplied to said relay.

13. The apparatus defined in claim 5, wherein said irreversibly interrupting means includes (a) means for temporarily supplying electrical energy to a relay to close a normally open contact of said relay, and (b) additional electromechanical means for changing the position of a mechanical member such that it locks said temporarily closed contact in a closed position, thereby causing said relay to retain said contact in said closed position thereafter.

14. The apparatus defined in claim 5, wherein said irreversibly interrupting means includes:
  (a) a first enclosure containing at least one fluid consisting of (i) a pressurized gas, and (ii) a pressurized liquid in which a gas is dissolved;
  (b) a second enclosure contained within said first enclosure and containing a pressurized gas, said second enclosure having a flexible surface member, such that fluid forces acting on an outer surface of said member cause said member to move;
  (c) a pressure-sensitive electrical switch contained within said second enclosure and responsive to movement of said member; and
  (d) a valve at a boundary of said first enclosure;
  wherein,
  (a) in a first state, a high pressure of said fluid in said first enclosure applies a large force to the outer surface of said member, causing said member to remain in a first position and thereby maintaining said pressure-sensitive switch in a first position;
  (b) in a second state, a low pressure of said fluid in said first enclosure applies a small force to the outer surface of said member, causing said member to move to a second position, and thereby causing said pressure-sensitive switch to move to a second position;
  whereby the opening of said valve allows the escape of at least some of said fluid from said first enclosure, thereby causing a transition from said first state to said second state.

15. The apparatus defined in claim 14, wherein said valve includes valve control means comprising at least one of a) electrical, b) hydraulic, c) pneumatic, d) mechanical and e) direct manual control.

16. The apparatus defined in claim 4, wherein said means for restoring said link includes means for changing the position of an electrical switch.

17. The apparatus defined in claim 4, wherein said means for restoring said link includes means for generating a command to be sent to a microprocessor.

18. The apparatus defined in claim 5, wherein said means for interrupting said link includes means for changing the position of an electrical switch.

19. The apparatus defined in claim 5, wherein said means for interrupting said link includes means for generating a command to be sent to a microprocessor.

20. The apparatus defined in claim 5, wherein said means for interrupting said link includes means for removing a mechanical link.

21. The apparatus defined in claim 1, wherein said alternate source of control includes at least one of (a) an aircraft autopilot and (b) a flight control computer.

22. The apparatus defined in claim 1, wherein said alternate source of control includes a human pilot on another aircraft.

23. The apparatus defined in claim 1, wherein said alternate source of control includes a human pilot on the ground.

24. The apparatus defined in claim 1, wherein said alternate source of control includes a human pilot at sea.

25. The apparatus defined in claim 1, wherein said alternate source of control includes (a) at least one of an on-board autopilot and an on-board aircraft flight control computer and (b) an off-aircraft human pilot, whereby a first type of third control signal causes said at least one of an on-board autopilot and an on-board flight control computer to control the flight, and a second type of third control signal causes said off-aircraft human pilot to control the flight.

26. The apparatus defined in claim 25, wherein said flight control computer is programmed to fly said aircraft to a particular destination.

27. The apparatus defined in claim 26, wherein said particular destination is not the originally intended flight destination.

28. The apparatus defined in claim 21, wherein said flight control computer is programmed to fly to a particular destination.

29. The apparatus defined in claim 28, wherein said particular destination is not the originally intended flight destination.

30. The apparatus defined in claim 1, wherein said third control signals originate from at least one of (a) a terrestrial source, and (b) another aircraft.

31. The apparatus defined in claim 1, wherein a part of said second control module is physically inserted into said first control module.

32. The apparatus defined in claim 31, wherein said insertion causes said first connecting means to interrupt said link.

33. The apparatus defined in claim 1, wherein the second control module is electrically connected to the first control module.

34. The apparatus defined in claim 33, wherein said connection of said first control module with said second control module causes said first connecting means to interrupt said link.

35. The apparatus defined in claim 1, wherein said first control module and said second control module are adapted for fixed installation in said aircraft and wherein the act of connection is effected without moving the modules.

36. The apparatus defined in claim 35, wherein said act of connection includes at least one of (a) changing the position of an electrical switch, (b) transmitting an electromagnetic signal, (c) transmitting a radiofrequency signal, and (d) transmitting a command to a microprocessor.

37. The apparatus defined in claim 1, wherein said first control signals are electrical signals.

38. The apparatus defined in claim 1, wherein said first control signals are mechanical impulses.

39. The apparatus defined in claim 1, wherein said second control signals are electrical signals.

40. The apparatus defined in claim 1, wherein said second control signals are mechanical impulses.

41. The apparatus defined in claim 2, wherein said handshake unit produces at least one of (a) an audible alarm; (b) an indicator light; (c) an electrical signal; and (d) an electromagnetic signal, when said first control module and said second control module are not properly connected.

42. The apparatus defined in claim 41, wherein at least one of said electrical signal and said electromagnetic signal causes an irreversible interruption of said link.

43. The apparatus defined in claim 41, wherein at least one of said electrical signal and said electromagnetic signal causes said second connecting means to select at least one of (a) the autopilot and (b) the flight computer as the means of aircraft control.

44. The apparatus defined in claim 41, wherein at least one of said electrical signal and said electromagnetic signal causes said second connecting means to select an off-aircraft pilot as the means of aircraft control.

45. The apparatus defined in claim 1, wherein said second connecting means includes at least one of (a) means for irreversibly disconnecting said first control signals and (b) means for irreversibly connecting said second control signals to said aircraft control system for control of said controlled component.

46. The apparatus defined in claim 45, wherein at least one of said irreversibly disconnecting and connecting means includes means for chemical dissolution of an electrical connection.

47. The apparatus defined in claim 45, wherein at least one of said irreversibly disconnecting and connecting means includes means for removing an electrically conductive liquid from an electrically conducting reservoir, said liquid forming an electrical conductor, said removal thereby rendering said reservoir non-conductive.

48. The apparatus defined in claim 45, wherein at least one of said irreversibly disconnecting and connecting means includes a meltable electrical conductor and means for melting said conductor.

49. The apparatus defined in claim 45, wherein at least one of said irreversibly disconnecting and connecting means includes means for programming a write-once memory of a logic circuit.

50. The apparatus defined in claim 45, wherein at least one of said irreversibly disconnecting means includes means for irreversibly interrupting at least one of (a) a fluid line, (b) a mechanical cable and (c) a mechanical link.

51. The apparatus defined in claim 45, wherein at least one of said irreversibly disconnecting and connecting means includes means for at least temporarily interrupting an electrical energy supply to a relay to open a normally open contact of said relay, said energy supply being routed through said normally open contact when it is closed by said relay thereby causing said relay to retain said contact in the closed position as long as electrical energy is supplied to said relay.

52. The apparatus defined in claim 45, wherein at least one of said irreversibly disconnecting and connecting means includes means for temporarily supplying electrical energy to a relay to close a normally open contact of said relay, said energy supply being routed through said contact when it is closed by said relay, thereby causing said relay to retain said contact in the closed position as long as electrical energy is supplied to said relay.

53. The apparatus defined in claim 45, wherein at least one of said irreversibly disconnecting and connecting means includes (a) means for temporarily supplying electrical energy to a relay to close a normally open contact of said relay, and (b) additional electromechanical means for changing the position of a mechanical member such that it locks said temporarily closed contact in a closed position, thereby causing said relay to retain said contact in said closed position thereafter.

54. The apparatus defined in claim 45, wherein at least one of said irreversibly disconnecting and connecting means includes:
  (a) a first enclosure containing at least one fluid consisting of (i) a pressurized gas, and (ii) a pressurized liquid in which a gas is dissolved;
  (b) a second enclosure contained within said first enclosure and containing a pressurized gas, said second enclosure having a flexible surface member, such that fluid forces acting on an outer surface of said member cause said member to move;
  (c) a pressure-sensitive electrical switch contained within said second enclosure and responsive to movement of said member; and
  (d) a valve at a boundary of said first enclosure;
  wherein,
  (a) in a first state, a high pressure of said fluid in said first enclosure applies a large force to the outer surface of said member, causing said second member to remain in a first position, and thereby maintaining said pressure-sensitive switch in a first position;
  (b) in a second state, a low pressure of said fluid in said first enclosure applies a small force to the outer surface of said member, causing said member to move to a second position, and thereby causing said pressure-sensitive switch to move to a second position;
  whereby the opening of said valve allows the escape of at least some of said fluid from said first enclosure, thereby causing a transition from said first state to said second state.

55. The apparatus defined in claim 54, wherein said valve includes valve control means comprising at least one of a) electrical, b) hydraulic, c) pneumatic, d) mechanical and e) direct manual control.

56. The apparatus defined in claim 1, wherein said second connecting means includes means for selecting said first control signals and connecting said first control signals to said aircraft control system for control of said controlled component, in response to said third control signals.

* * * * *